Sept. 5, 1933.　　　　J. W. WALTON　　　　1,925,510
MANUFACTURE OF PHOSPHORIC ACID AND OTHER PRODUCTS FROM PHOSPHATIC MATERIAL
Original Filed March 23, 1929　　2 Sheets-Sheet 1
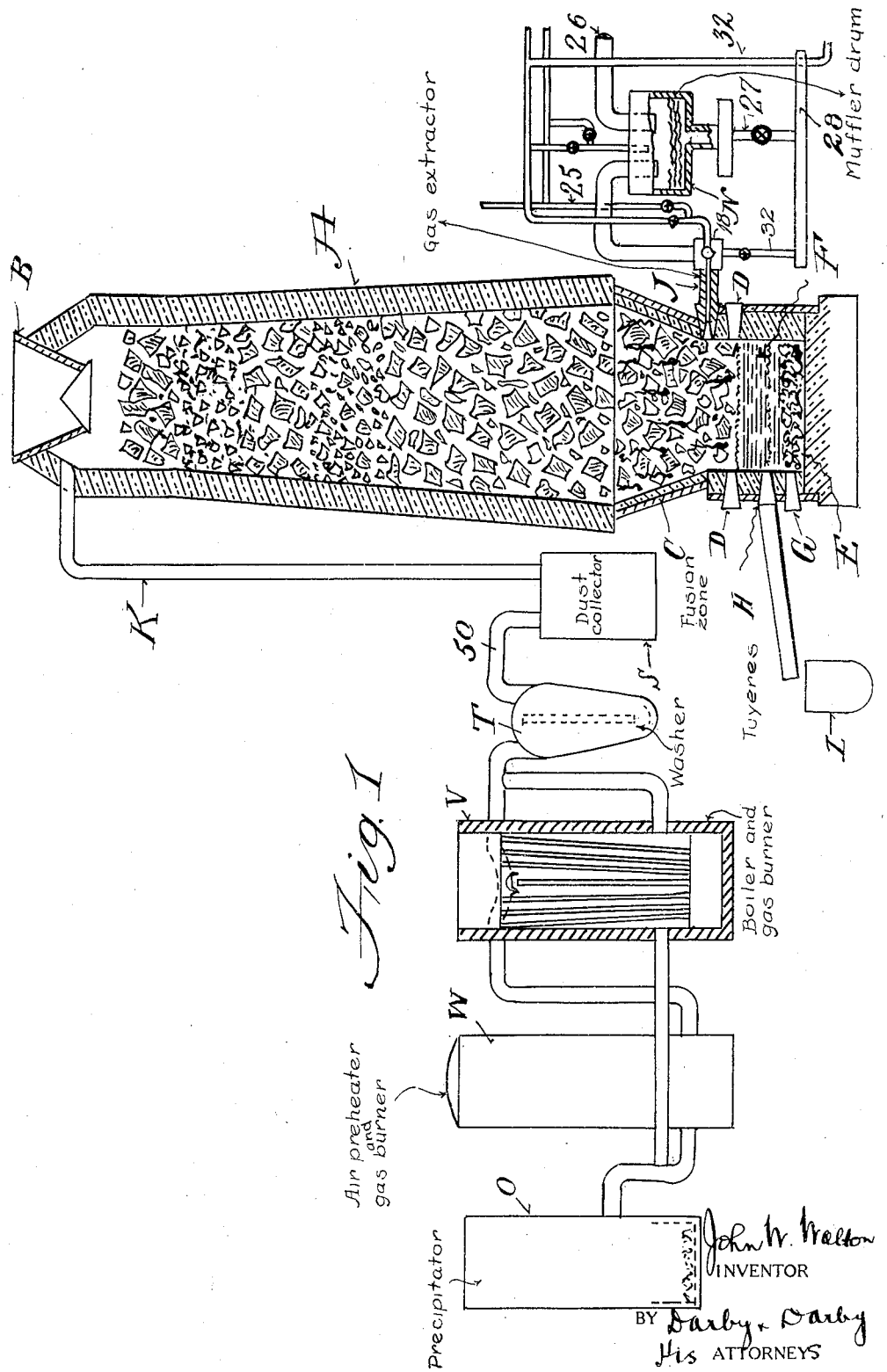

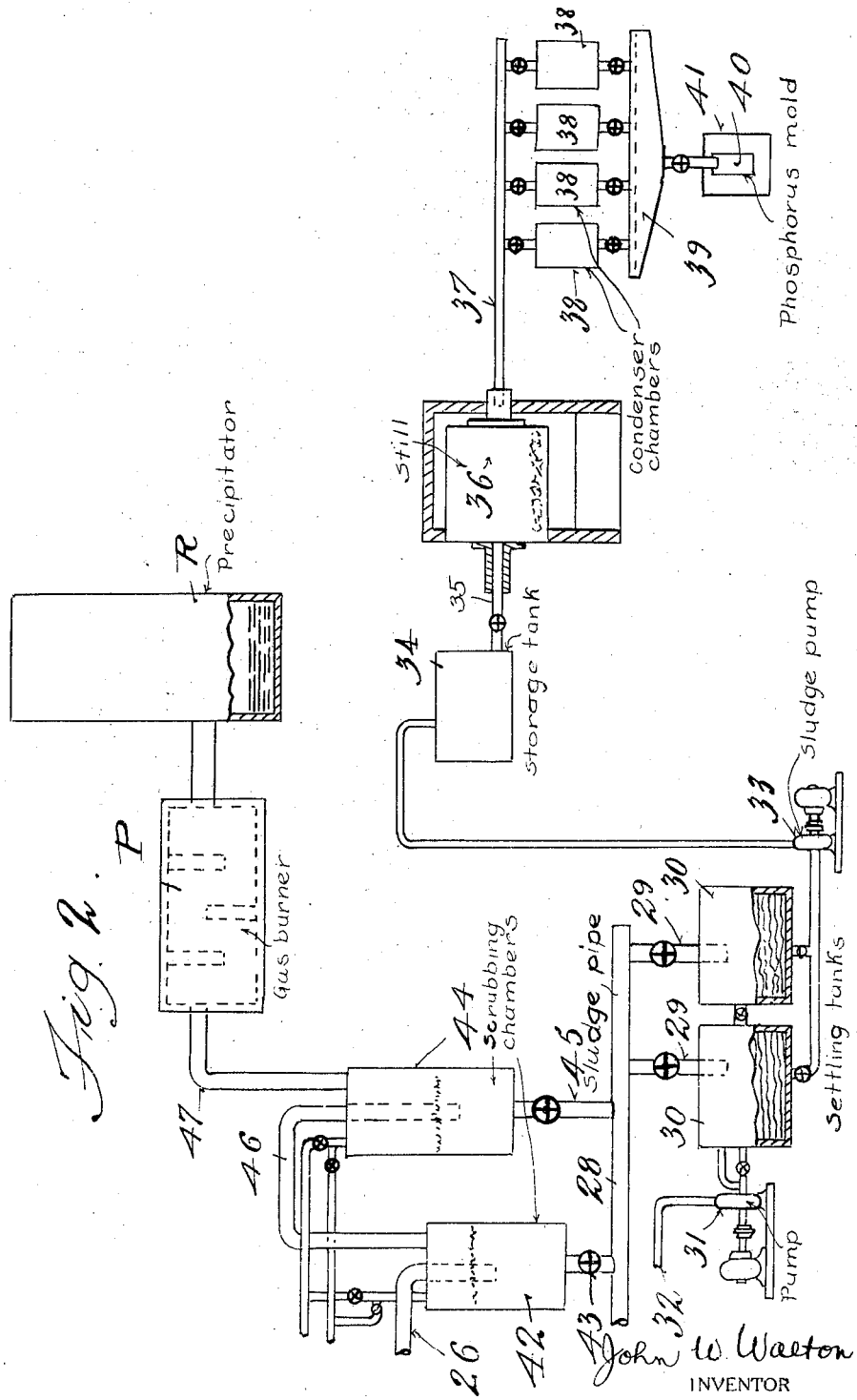

Patented Sept. 5, 1933

1,925,510

UNITED STATES PATENT OFFICE 1,925,510

MANUFACTURE OF PHOSPHORIC ACID AND OTHER PRODUCTS FROM PHOSPHATIC MATERIAL

John William Walton, Rockdale, Tenn., assignor to Tennessee Products Corporation, Nashville, Tenn., a corporation of Tennessee Original application March 23, 1929, Serial No. 349,328. Divided and this application May 28, 1930. Serial No. 456,448.

5 Claims. (Cl. 23—165)

This invention relates to the manufacture of phosphatic and other products from phosphatic material.

More particularly stated, the invention relates to the manufacture of phosphorus, phosphoric anhydrid, phosphoric acid and other commercial products from the smelting of phosphatic containing material, such as phosphatic ore, rock, or other material having a phosphatic content along with carbon, iron bearing material and suitable fluxing agents, in a blast or other type of fuel fired furnace, and the treatment of the gases evolved from such smelting operation to obtain therefrom the desired products.

The object of the invention is to carry on the smelting, in a blast or other type of furnace, of phosphatic material, iron bearing material, fluxing agents and carbon, in such a manner, and under such control, as to evolve or give off gases which are suitable for treatment to recover therefrom elemental phosphorus, phosphoric anhydrid, phosphoric acid, polishing powders, fertilizers and other commercial products.

The invention consists substantially in the mode of operation, control, treatment and products, all as will be more fully hereinafter set forth, as illustrated in the accompanying drawings, and finally set forth in the appended claims.

Referring to the accompanying drawings,—

Figure 1 is a view, parts in vertical section illustrating somewhat diagrammatically a furnace of the blast furnace type and auxiliary connections for drawing off and treating the gases evolved during the smelting operation carried on in said furnace.

Fig. 2 is a diagrammatic view illustrating apparatus for treating the gases drawn off from the fusion zone of the furnace.

The subject-matter herein set forth, described and claimed is divided out from my application Serial No. 349,328, filed March 23, 1929.

In the operation of blast or other types of fuel fired furnaces in the manufacture of phosphids of iron, such, for example, as the product known as ferro-phosphorus, as heretofore ordinarily carried out, phosphatic material, iron bearing material, carbon and suitable fluxing agents are charged into the top of the furnace, and the stack or mass is ignited at the base, a blast of heated air being supplied into the furnace near its base to maintain combustion of the carbon content of the charge. The gases generated and other heated products of the combustion which rise through the stack or pile of material, heats the iron bearing material and tends to reduce the iron contained therein to the metallic state, as the mass descends through the furnace, and the heat generated at the base of the furnace tends to liberate phosphorus gases from the phosphatic material charged into the furnace. The liberated phosphorus gases react with the free carbon in the presence of the heat created to release elemental phosphorus from said gases. This liberated phosphorus then reacts with the reduced metallic iron to produce iron phosphid, such as ferro-phosphorus, which drips down into a chamber at the base of the furnace to form a molten pool which is tapped off to form the commercial product. At the same time a molten slag also accumulates in a pool which overlies the ferro-phosphorus pool, and this molten slag is likewise drawn off and treated to produce commercal products, or is otherwise disposed of.

While it has been known that the gases and other products of combustion evolved and given off during the smelting operations carried on in the furnace, contain valuable properties and constituents, and especially valuable quantities of phosphorus in various forms of compounds, no serious effort, so far as I am aware, has heretofore been directed towards the recovery, and utilization of said properties and constituents in the form of commercial products, nor have any efforts been made to regulate or control the smelting operations carried on in the furnace so as to generate or evolve and give off gases or other combustion products of such enhanced or enriched quality, character or content as to render the further treatment thereof for the recovery of such content an advantageous and profitable enterprise.

My present invention relates more particularly to the control and regulation of the smelting operations and of the generation of phosphorus gases and compounds, and other contents of such gases, evolved during the smelting operations in a blast furnace, and the withdrawal of the said gases from the furnace at the proper time, and from the proper points whereby to produce efficiently and economically gases which are rich in phosphorus and other compounds and substances and of a nature and character to be easily, efficiently and economically extracted or recovered therefrom as commercial products, such as elemental phosphorus, phosphoric acid, polishing powder, fertilizers and other products.

I also propose to control and regulate the smelting operations carried on in a blast furnace, using the necessary raw materials, so as to produce gases having the necessary properties or contents for treatment as above pointed out, whether the smelting operations are carried out primarily for the production of such gases, and any iron phosphid produced being a by-product of the operation, or whether iron phosphid, or ferro-phosphorus is the primary product and the gases, and other products obtained therefrom are by-products. In either or any case the present invention deals with the operations, and the control and regulation thereof, for producing, as commercial products, elemental phosphorus, phosphoric acid, fertilizers, powders, etc. from gases evolved in smelting phosphatic material and iron bearing material with carbon and suitable fluxing agents, in a blast furnace.

I have discovered that in smelting phosphatic ores, or material, with iron bearing material in a blast furnace, distinctively different characters and qualities of gases may be obtained according to the point in the furnace from which such gases are drawn off. Thus, the gases taken or drawn off from near the top of the furnace, particularly where the amount of phosphatic content of the material employed is relatively small, generally carry only a small quantity of phosphorus or phosphorus compounds, and such gases also generally contain a large amount of impurities derived from the materials which are charged into the furnace.

It is my belief that these impurities are, in large part, carried mechanically in the gases, and are produced by the attrition or friction of the gases upon the particles of raw materials charged into the furnace as the gases are forced through the mass of said material at a rapid speed. I base this belief upon the fact that the impurities are usually carried along with the gases in a finely divided state. These gases, drawn from the top of the furnace are ordinarily utilized in various of the accessory appliances employed in the operation of the furnace, such as in the hot blast stoves which pre-heat the air blast supplied to the furnace; in heating the boilers of the power equipment, and for various other purposes. The presence of these impurities in the gases tend to clog up and obstruct the pipes and passages through which the gases travel. This very seriously interferes with the efficient and economical operation of the furnace and plant as a whole, and hence exerts an injurious effect in the generation of the phosphorus bearing gases and compounds.

On the other hand, I have discovered that the gases produced and existing in the lower and hotter portions of the furnace, when withdrawn from the region in which they are produced, are not only comparatively free from impurities in a finely divided state carried along mechanically by the gases, but they are also richer in phosphorus, as well as in phosphorus pentoxid ($P_2O_5$), as compared with gases drawn off from the top of the furnace.

It is my belief that the reason for this difference in the nature and character of the gases drawn from the two different points of the furnace referred to, is that in a blast furnace in which iron bearing ore or material, and phosphatic ore, rock or material are smelted, two melting zones are produced. The phosphatic ore or material requires a much higher fusing temperature than does iron, limestone, silica, etc. and consequently the gases drawn from the top of the furnace are mainly generated by the fusion of the iron ore or material, the limestone, silica, etc. and hence are necessarily leaner in phosphorus content, whereas those drawn from the hotter portion of the furnace are produced as a result of a higher temperature and a more complete fusing of the phosphatic material, and consequently are richer in phosphorus content.

Another explanation of the difference in character, nature and content of the gases drawn from the two points of the furnace, referred to, according to my belief and experience, is that the reduction of the phosphatic material is facilitated and made more complete by bringing that material into contact with incandescent carbon. Iron oxid, on the other hand, is readily reduced by carbon monoxid gas. The heated gases ascending through the furnace, therefore, appear to effect the reduction of the iron bearing material, at least to a substantial extent, at a considerable distance above the region of the tuyères where the air blast is supplied into the furnace, and hence, where the greatest degree of heat occurs and where the phosphatic material as well as the carbon attain their highest degree of heat.

It is when the phosphatic material and the carbon are in their incandescent state, and are brought together in that state that the phosphatic material is more easily, readily and completely reduced. Consequently, the gases generated and existing in the furnace in and near the hottest point or fusion zone, namely, in the region of the tuyères, are much richer in phosphorus content, than are those drawn from the top of the furnace. Moreover, the gases generated and existing in the region of the fusion zone do not have the same opportunity to gather up and carry with them fine particles of material rubbed from the ore, carbon, etc. as do the gases which ascend through the pile or mass of the material to be drawn off from the top of the furnace, and hence the gases in the fusion zone are comparatively free from such mechanically carried particles and other impurities.

While therefore, within the broadest scope of my invention, I may draw off the gases generated within the furnace from either the top of the furnace stack, or from the fusion zone, or from any other desired point, and treat them for the recovery of the valuable constituents thereof, I prefer, in practice, to separately draw off the gases from the top and from the fusion zone of the furnace, according to the nature of the particular content of the gases that is to be recovered therefrom by the subsequent separate treatment thereof, thereby enabling me to take full advantage of the different natures and characteristics of the gases in the recovery of the valuable constituents of the same.

I have also discovered that by drawing of gases from the fusion zone or hottest part of the furnace, with or without drawing also from the top of the furnace, conditions are created in the furnace which result in a more rapid, perfect and complete fusion, reduction, and smelting of the materials charged into the furnace. This results in generating an improved quality of gas, that is, a gas that is richer in phosphorus content, in the region of the fusion zone, and also an improved and better quality of ferro-phosphorus product, and a more readily fusible slag, where said products also are to be produced, whether as primary products or as by products incidental to the production of the desired gases. The nature and quality of the ferro-phosphorus and slag products affects and controls to a large extent the nature and quality of the gases. This enrichment of the gases, and enhanced quality of the ferro-phosphorus and increased fusibility of the slag product, I believe to be due in a large measure to the better and more perfect and complete fusion of the materials, and more perfect and complete metallurgical and chemical reactions, which take place, by withdrawing a portion of the gases from the fusion zone of the furnace. I base this belief on the fact that by withdrawing more or less of the gases, particularly those generated or evolved and existing in the region of the tuyères, and the same thing holds true to a more or less extent, also, with regard to gases drawn off from the top of the furnace, opportunity is permitted to increase the supply of air blast through the tuyères, thereby securing better conditions within the furnace for carrying on the fusion and combining reactions.

This results in a more rapid combustion of the carbon in the charge, and hence a generation of a higher degree of fusing or smelting heat. This accelerates the combining reactions which take place in the furnace, resulting, in practice in the attainment of a higher temperature in a shorter space of time than heretofore, and consequently, permits a reduction in the quantity of carbon required, which is one of the most expensive of the materials charged into the furnace, without, however, preventing the presence and mantenance of sufficient free carbon in the fusion zone to accomplish the desired reactions. This secures greater economy as well as a richer gaseous product, and also a higher grade of ferro-phosphorus and a more fusible slag product.

In the practical operation of the furnace, in carrying out my invention, it is necessary to take into consideration various factors in order to secure the best results. The burden charged into the furnace should be composed of clean, high grade materials of the best quality. The various materials charged should be properly proportioned and balanced as between themselves, and maintained in that proper balance in the successive charges. Should an unbalanced condition of burden occur, the ordinary furnace man of experience, by well known methods, can readily and easily ascertain in what direction the unbalance occurs, and then take the proper steps to restore the balance. If the burden is found to be too lean or too limey, correction is effected by adding or reducing the lime or the silica contents of the charge, as the case may require.

By observing the volume and color of the gases finally escaping into the air from the top of the furnace stack, and the color of the escaping gases when burned, the experienced furnace man can ordinarily tell when the furnace is operating properly. These visible observations, based on experience, can be easily and readily checked by suitable and proper chemical analysis according to well known and well understood methods.

I have found that atmospheric conditions and humidity affect to some extent the fusing conditions and smelting reactions carried on within the furnace, and hence, also the character of the evolved gases and other products resulting from said reactions. This is particularly true when working with phosphatic materials. Therefore, in carrying out my invention in the most advantageous and desirable manner, the working operation and performance of the furnace should be carefully watched and controlled accordingly, not only in connection with the employment of the proper kind, nature and quality of the materials used, and the proper proportioning and balancing of the same in the successively charged burdens, but also with respect to the supply of air blast, its dryness and quantity, and the degree to which it is preheated. I have found in practice that an air blast supply ranging from four thousand to sixteen thousand cubic feet of air per minute, according to the nature, character and conditions of the burden, atmospheric conditions and size or capacity of the furnace, is satisfactory to maintain the two melting or fusion points or zones at their proper respective locations within the furnace, and to secure the proper and efficient reactions.

If insufficient air is supplied, the phosphatic and iron bearing materials will not be properly fused and will not properly react or combine, with the result that inferior grades of gaseous, ferro-phosphorous, slag and other products will be produced. If too great a volume of air is supplied, the melting or fusion points will be raised to too great a height within the furnace, thereby resulting in setting free phosphorus pentoxid gases ($P_2O_5$) at a point too high up in the furnace to enable said gases to properly react with the carbon or to be altered by the carbon into a form enabling them to combine or react with the iron present, and possibly other disadvantages also result from the use of too great or small a volume of air. However, with a properly proportioned or balanced burden of the proper quality and grade of materials, a proper control of the operations of the furnace, and of the air supply, a complete effective and satisfactory fusing and combining reaction is attained, thereby resulting in the generation and evolution of the desired character of gaseous products suitable for treatment for the recovery therefrom of the valuable constituents thereof, as well as the production of the desired ferro-phosphorus, slag and other products which not only contribute their share to the production of the desired gases but constitute in themselves desirable commercial products.

An illustrative burden of proper balance, depending on the various conditions above referred to, and which I have found to be satisfactory in carrying out my invention is as follows:

|  | Pounds |
| --- | --- |
| Coke (84% carbon) | 5200 |
| Phosphate rock (containing 12% to, say, 17% phosphorus) | 4400 |
| Iron ore (containing from 38% to 50% iron) | 3200 |
| Iron ore tailings (containing from 40% to 60% or 70% silica and 10% to 30% iron) | 2400 |

An air blast of from eight thousand to twelve thousand cubic feet per minute.

It is to be understood, however, that this is only an illustrative burden which I have found to be satisfactory under certain conditions.

My invention, therefore, is not to be limited or restricted to the exact proportions given, as such proportions may be varied from throughout a wide range and still the benefits and advantages of my invention realized in whole or in part.

For example, I may replace the whole or part of the iron ore tailings with scrap iron, or other forms of metallic iron. Instead of relying on the silica content of iron tailings for the necessary silica for a fluxing agent, and on the phosphatic ore having a lime content for the necessary lime for a fluxing agent, I may independently supply lime and silica, either or both, and in the required proportional amounts to constitute the fluxing agents.

It is also to be understood that the phosphorous content of the charge may be derived from other sources than phosphate rock as, for instance, from ferro-phosphorus, "off" 5-ferro-phosphorus, or from other materials.

In the accompanying drawings I have shown a conventional form of blast furnace suitable for use in carrying out my invention. Generally the furnace consists of a vertical shaft portion A, into the open top of which the material to be treated is charged, the open top being closed, after the charge is introduced, by a bell or other closure B. The shaft portion A, increases in interior area from its top towards the bottom thereof. Below the lower end of the shaft portion A, is the portion C, which, usually, is of decreasing interior area, downwardly from its line of junction with the shaft portion A. Within this portion C, occurs what is called the fusion zone in which the principal smelting reactions take place. Near the bottom of the portion C, are located the tuyères D, through which the air blasts are delivered into the furnace. Below the tuyères are located the chambers F, and E, in which, respectively, collect the molten slag, and iron phosphid or ferro-phosphorus products and from which said molten products may be drawn or tapped off through the notches H, and G. Communicating with the shaft A, at or near its upper end, is a pipe connection K, through which gases may be drawn off. Communicating with the portion C, of the furnace at or near the vicinity of the tuyères, are one or more outlets or extractors J, through which gases evolved and existing in the fusion zone or hottest part of the furnace may be drawn off.

The particular location of these outlets or extractors is not of consequence so long as they are so located as to serve the purpose of drawing off or extracting the gases from the region of the chamber or portion of the furnace where the principal reactions take place, that is, from the region of the zone of the highest temperature and pressure of the furnace.

The material employed in the form of coke, phosphatic material, iron bearing material and lime and silica, as fluxing agents, is charged into the furnace in the manner now well known and practiced. This mass is ignited at the base of the pile and combustion is maintained by the air blast. The heated products of combustion, and the gases evolved and given off tend to ascend, or are driven by the force of the blast through the mass of materials, and, as the combustion and smelting operations proceed, the charged materials descend through the furnace shaft. The descending mass of materials encounters the upward flow of the heated gases, thereby beginning and carrying on the smelting and other reactions, which are finally completed in the fusion zone. Any slag or iron phosphid produced, collects, in molten condition, in the chambers F, E, and any phosphorus containing or other gases, generated or evolved are drawn off through the pipe connections K, J, one or both.

My present invention is concerned with the gases and gaseous products that are drawn off from the furnace and their treatment for the recovery therefrom of various valuable commercial products.

As hereinabove stated these gases, not only contain fine particles of material derived from the materials charged into the furnace, but also phosphorus in one form or another, the gases drawn off from the top of the furnace carrying a larger volume of the fine particles than those drawn off from the fusion zone, while the latter are richer in phosphorus content, due to the more perfect fusing and combining reactions which take place within this portion of the furnace. These gases, whether drawn off from the one point or the other, may be treated in various ways to recover therefrom their valuable constituents. It will be understood that the gases within the furnace in the region of the tuyères, say in a region roughly defined by the level of the slag in chamber F, upwardly to the top of the bosh, or widest part of the furnace, are subjected to the maximum temperature, and pressure developed in the furnace. The temperature runs, for example, from 2,000° F. to 3,000° F. and the gases are maintained under a pressure of from four pounds, to, say, fifteen pounds above atmospheric pressure. This temperature and pressure to which the gases are subjected will vary, somewhat, according to the practical conditions under which the furnace is operated, and, accordingly the best location of the point from which the gases are withdrawn, can ordinarily be ascertained from practical experience in operating the furnace. I have found that a location of the point of withdrawal of gases from the fusion zone at an elevation of around eighteen inches above the tuyères gives satisfactory results, but, obviously, my invention is not to be limited or restricted in this respect.

One practical method of drawing off the gases from the region of the tuyères, as I have defined that region, which I have found efficient and suitable, is to insert one or more pipes J, through the wall of the furnace, the inner ends of said pipes projecting into the furnace and to connect an enlarged drum or muffler N, to the outer ends of said pipes. The gases are forced from the interior of the furnace by the pressure under which they are subjected in the furnace, through the pipe J, and into the muffler N. I prefer to deliver into the pipe J, a jet or spray of water or steam. This can be accomplished in various ways. A simple arrangement is to locate a spray jet or head 18, within the pipe connection J and to deliver thereto water or steam under pressure, as, for example through pipe connection 25, from any convenient source. Where water is supplied, it is instantly converted into steam which becomes superheated from the heat of the gases. The purpose of supplying the water, or steam, is two-fold. In the first place it prevents the pipe connection J from burning out, under the high temperature of the gases, and in the second place, and more important, the superheated steam reacts upon the gases in such manner as to cause a deposit of substances upon the inner wall surface of the pipe connection. This deposit adheres to the surface of the pipe and forms a coating or lining constituting a heat insulation therefor. I have found this coating substance to be composed principally of silica having in admixture therewith varying amounts of elemental phosphorus, red phosphorus and possibly other phosphorus compounds. Just what chemical reactions take place within the pipe connection J, and within the drum or muffler N, I am unable to say with accuracy but it is my belief that when the hot gases come in contact with the water which has been converted into superheated steam, ammonia, phosphin and other compounds are formed.

In the case of ammonia the nitrogen element thereof undoubtedly is obtained from the air of the air blast supplied through the tuyères. I have demonstrated that ammonia gas is copiously produced, and this indicates to me that the gases are maintained in the furnace under pressure. I have found in practice that after the deposited lining has been formed, as above explained, on the inner surface of the pipe, the water (or steam) jet may be cut off. In such case, however, care must be taken to prevent the continuation of the deposit to the point where it will clog the entire bore of the pipe J. I find that this danger of clogging from a deposit of a coating or lining extends also to the drum N, as well as to the pipe connection 26, delivering from the drum, and, consequently, care must also be taken to prevent such clogging of the said drum and delivery pipe.

I have found that an accumulation or deposit of fluid, sludge, etc. takes place within the drum N, which should be drained off from time to time. For this purpose a valve controlled drain pipe 27, see Fig. 1, is connected to the bottom of the drum N, and to a sludge pipe 28. This fluid or sludge, I have found, contains various substances, such as elemental phosphorus, red phosphorus, silica, aluminum and other compounds, which may be recovered by sedimentation or otherwise. For this purpose I have shown the sludge drain pipe 28, as delivering through valve controlled connections 29, to one or more settling tanks 30, see Fig. 2. Any supernatant water collecting in the settling tanks 30, may, if desired, be pumped back into the water system and used over again in the water jet.

I have shown a pump 31, Fig. 2, for this purpose, said pump delivering the water which collects in the settling tanks, through pipe 32 to the water jet pipe at the fitting J. As this water carries with it more or less phosphorus content, by using the water over again this phosphorous content is permitted repeated opportunities to eventually settle out and be recovered.

The substances which accumulate as sediment in the settling tanks 30, may be collected and treated in any convenient, suitable or appropriate way to recover the phosphorus and other valuable contents thereof. I have found a simple and efficient way to treat this sediment is to distill the same and recover the elemental phosphorus from the distillator. This product is then moulded into convenient form for sale and commercial use. I have indicated a simple arrangement for carrying out this operation, wherein the sludge or sediment which collects in the settling tanks 30, is drawn off therefrom by means of a pump 33, and delivered into a storage tank 34. From this storage tank said material is delivered through a valve controlled pipe connection 35, into a still 36 of any suitable or desired type or structure. A rotary drum type is shown. The elemental phosphorus contained in the hot vapors given off from the still may be collected and recovered therefrom in various ways. In practice I have found it satisfactory to deliver the hot vapors into a body of comparatively cold water to cause the phosphorus to congeal into a wax-like mass, and to remove said mass and subject the same to the softening action of warm or hot water to enable the same to be molded into the desired commercial form or shape.

I have illustrated an arrangement suitable for carrying out this operation, wherein the hot vapors from the still 36 are delivered through pipe 37, into condenser chambers 38, in which cold water is contained. The water should be of a temperature of 40° F. to 60° F. The wax-like mass of phosphorus which collects in the condensers 38 is removed or drawn off into a trough 39 adapted to contain hot water whereby the phosphorus is sufficiently melted or softened to be supplied into molds 40, immersed in hot or warm water contained in chamber 41, thereby molding the same into the desired shape. The temperature of the warm or hot water employed in these operations should be sufficient to melt or soften the phosphorus sufficiently to enable it to be molded into the desired shape. I have found that a water temperature of from 100° to 125° F. is satisfactory.

The residue of the distilling operation, after removal of the phosphorus vapors, is still rich in phosphatic material, and I have found that when ammonia and potash salts are added thereto an excellent merchantable fertilizer product is obtained therefrom.

Having thus described the treatment of the sludge, fluid and other material deposited in the drum N, into which the gases from the furnace are delivered, I will now describe the treatment of the gases which are delivered from the drum N through pipe 26. This pipe leads into a chamber 42, see Fig. 2, and its delivery end is immersed in a body of water contained in said chamber. By this arrangement the gas splashes or bubbles up through the water and is thereby more or less scrubbed or filtered, leaving in the water or chamber a sludge or sediment similar to, but which contains a larger quantity of phosphorus than the sludge obtained from drum N.

This sludge or sediment may be drawn off and treated in the same way as above described to recover therefrom elemental phosphorus and fertilizer material as commercial products. I have shown the chamber 42, connected by valve controlled pipe connection 43, with the sludge pipe 28 through which the sludge drawn from chamber 42 may be added to and treated along with that drawn from the drum N. as above described.

After the gases have been subjected to the scrubbing or filtering action, above referred to, in chamber 42, they may be passed on through pipes 46 to one or more additional water sealed scrubbing or filtering chambers, as 44, similar to chamber 42, and thus subjected to a succession of scrubbing and filtering operations, each resulting in the collection of a similar sludge or sediment, which, likewise, may be treated in the same manner as above described, the additional chambers 44, delivering through valve controlled pipe connections 45, to the sludge pipe 28. The final residual gases pass from the last scrubbing chamber through a pipe connection 47. These gases are then treated to remove therefrom any carbon monoxide or other inflammable gas constituent thereof, and also to convert any remaining phosphorus therein present into pentoxid of phosphorus or to anhydrid of phosphoric acid ($P_2O_5$). The removal of the carbon monoxide and other inflammable gases is desirable in order to remove the danger of explosion when said gases are subjected to the action of a precipitator, particularly if the precipitator is of the electric type. The conversion of any elemental phosphorus into the pentoxid reduces the phosphatic compounds remaining in the gases to a condition which is suitable for the precipitation therefrom of phosphoric acid.

To carry out this treatment in one practical and efficient mode, I propose to burn the gases and then to subject the products of combustion to precipitation to produce phosphoric acid. In the illustrative arrangement shown, the pipe 47 from the last of the series of scrubbing chambers 44, delivers into a suitable combustion chamber P, in which the gases are burned, to remove the carbon monoxide and other inflammable gases therefrom, and to oxidize any elemental phosphorus to phosphorus pentoxid. From the combustion chamber the resulting gaseous products, after being cooled down to a suitable temperature of, say, from 90° to 110° F., are delivered into and subjected to the action of a precipitator R. This precipitator may be of any desired commercial type, such, for example, as an electrical precipitator of the Cottrell type. The resulting precipitate, phosphoric acid, is then drawn off for commercial use or sale, or such further refinement as may be necessary or required.

The heat developed by the burning of the gases in the combustion chamber P, may be utilized for any desired purpose.

Where the gases generated and evolved in the furnace, and other products of combustion, are drawn off from the top of the furnace instead of from the fusion zone, they may be treated in the same manner as above described for the recovery therefrom of elemental phosphorus, phosphoric acid and fertilizer material. However, and as above pointed out, where said gases and gaseous products are drawn off from the top of the furnace, they carry along with them particles of dust and other fines from the burdens charged into the furnace.

This is true whether all the gases are drawn off from the top of the furnace instead of from the fusion zone, or whether they are drawn off from both points. I have discovered that the fines, dust and the like, so carried along, with the gases contain carbon, silica, alumina, lime, potash, iron oxid, phosphorus pentoxid and perhaps other materials, which, in combination, or in admixture with each other, constitute a valuable cleansing and polishing agent in the form of a powder which is unctious, impalpable and free from crystaline particles. This powder can be separated out from the gases in various ways, and collected and packaged as a commercial article for sale or use. In practice I have found it convenient, practical and efficient to preliminarily catch and separate out from the gases the larger particles of dust, carbon and the like, and then treat the gases which retain the finer particles. Such treatment, in one practical mode, consists in burning the gases, usefully employing, in any desired way, the heat developed by the burning operation, and finally precipitating the dust, fines, etc. from the products of combustion.

In the drawings, Fig. 1, I have shown an arrangement in which the gases are drawn from the fusion zone and also from the top of the furnace, and I have above pointed out that the gases drawn from the top of the furnace, are lower in phosphorus content and richer or more heavily laden with dust, fines, etc. than are those drawn from the fusion zone, and in practice I prefer this method of separately drawing off and treating the gases, because of these differences in the characters of the gases when drawn off from these respective points, although, in its broadest scope, my invention is not to be limited or restricted in this respect.

As shown, the pipe K, connected to the top of the furnace delivers into a dust collecting and settling chamber S, and thence passes by pipe 50 into and through a washer T, containing water. The larger particles of fines carried along with the gases will settle down in chamber S, or will be caught in the washer T. From the washer the gases are conducted to a boiler V, employed for generating steam, or to a stove W, for preheating the air blast supply to the furnace, or to both of these accessory devices, where said gases are burned. It is my belief that in burning the gases only the carbon monoxid, and possibly other inflammable gases, contained therein are consumed, whereas the dust, fines and the like, are not.

After burning the gases, as above described, the products of combustion are subjected to the action of a precipitator, indicated at O, which may be of the Cottrell electric or any other suitable type, whereby the fines, dust, etc. are thrown down as a precipitate, in the form of a light grayish to white powder which constitutes a valuable product as a cleansing and polishing agent which may be collected and packaged for sale or use.

A typical analysis of this powder is as follows:

| | |
|---|---|
| Moisture (100° C.) | 2.00% |
| Silica | 48.92% |
| Alumina | 16.46% |
| Lime | 12.60% |
| Magnesia | .15% |
| Manganese oxid | .30% |
| Iron oxid | 5.48% |
| Phosphorus pentoxid ($P_2O_5$) | 5.72% |
| Potash ($K_2O$) | 7.57% |
| Sodium oxid ($Na_2O$) | trace |
| Fluorin | .80% |
| Carbon | trace |
| | 100.00% |

Should the dust product after precipitation, be found to contain solid particles, such as carbon, lime or the like, in uncombined condition to any undesirable extent, such foreign and undesirable particles may be readily separated out and removed mechanically by sifting or other well known methods.

From the foregoing description it will be seen that I provide a method of treating phosphatic material, iron bearing material, carbon and fluxing agents in an ordinary blast furnace, and to obtain from such treatment, under proper and suitable conditions of control of the materials employed, and of the operations, gaseous products which contain or carry valuable constituents capable of being recovered therefrom as commercial articles and substances, whether such treatment and operations are carried on for the primary object of obtaining the commercial articles and substances, or whether they are obtained as by-products from the treatment and operations primarily designed for the manufacture of other commercial products such as ferro-phosphorus.

Having now set forth the objects and nature of my invention, and the manner of carrying the same into practical use and operation, what I claim as new and useful, and of my own invention, and desire to secure by Letters Patent is:

1. The process which consists in drawing off a portion of the gases rich in phosphorus from the combustion zone of a blast furnace charged with phosphatic materials, and delivering a jet of water into the hot gases and at a point closely adjacent that at which they are drawn off, to deposit from said gases an insulating coating upon the inner walls of the conduit through which they are drawn off.

2. The process which consists in drawing off a portion of the gases rich in phosphorus from the combustion zone of a blast furnace charged with phosphatic materials, and delivering a jet of water into the hot gases as they are drawn off, then scrubbing or filtering the gases by passing successively through chambers containing water, then burning the scrubbed and filtered gases, and finally precipitating the burned gases to recover phosphoric acid therefrom.

3. The process which consists in drawing off a portion of the gases rich in phosphorus from the combustion zone of a blast furnace charged with phosphatic materials, and delivering into the gases so drawn off, a jet of water, then delivering the gases into a settling tank to permit the sludge content thereof to settle out therefrom and returning the supernatant water from the settling tank into the water supply to the withdrawn gases.

4. The process which consists in drawing off a portion of the gases rich in phosphorus from the combustion zone of a blast furnace charged with phosphatic materials, and delivering into the gases so drawn off, a jet of water, then delivering the gases into a settling tank to permit the sludge content thereof to settle out therefrom, then distilling the settled sludge and adding ammonia salts to residue of the distilling operation to form a fertilizer.

5. The process which consists in drawing off a portion of the gases rich in phosphorus from the combustion zone of a blast furnace charged with phosphatic materials, and delivering into the gases so drawn off, a jet of water, then delivering the gases into a settling tank to permit the sludge content thereof to settle out therefrom, then distilling the settled sludge and adding ammonia and potassium salts to the residue of the distilling operation to form a commercial fertilizer.

JOHN WILLIAM WALTON.